(No Model.)   H. T. HARRISON.   2 Sheets—Sheet 1.
ELECTRIC METER.

No. 537,769.   Patented Apr. 16, 1895.

Witnesses   Inventor (No Model.)

H. T. HARRISON.
ELECTRIC METER.

No. 537,769. Patented Apr. 16, 1895.

UNITED STATES PATENT OFFICE.

HAYDN THIES HARRISON, OF LONDON, ENGLAND.

ELECTRIC METER.

SPECIFICATION forming part of Letters Patent No. 537,769, dated April 16, 1895.

Application filed June 14, 1892. Serial No. 436,716. (No model.) Patented in England October 28, 1891, No. 18,595.

*To all whom it may concern:*

Be it known that I, HAYDN THIES HARRISON, a subject of the Queen of Great Britain and Ireland, residing at Dorchester Place, Blandford Square, London, England, have invented Improvements in Electric Meters, of which the following is a specification, and for which an English patent has been granted, dated October 28, 1891, No. 18,595.

In an electrical energy or quantity meter according to this invention, the electrical energy to be measured, is caused to increase the amplitude (*i. e.*, the length of swing or oscillation) of a pendulum or equivalent oscillating device, (for example a balance wheel,) the number of swings or oscillations whereof per minute is kept constant, and the increase of amplitude is registered by any suitable registering mechanism. Measuring apparatus to operate on this principle may be constructed and arranged in various forms. The pendulum can be kept swinging by a shunt current, or by clock mechanism in a manner well understood, at a constant number of beats per hour, and normally at a constant amplitude but which amplitude is according to this invention increased by the electrical energy or quantity to be measured while the number of beats remains constant. For this purpose the pendulum is kept of a given length, care being taken that the force exerted by gravity on the pendulum shall remain unaffected, and that only the electrical force which keeps the pendulum in motion shall be increased.

Figure 1:
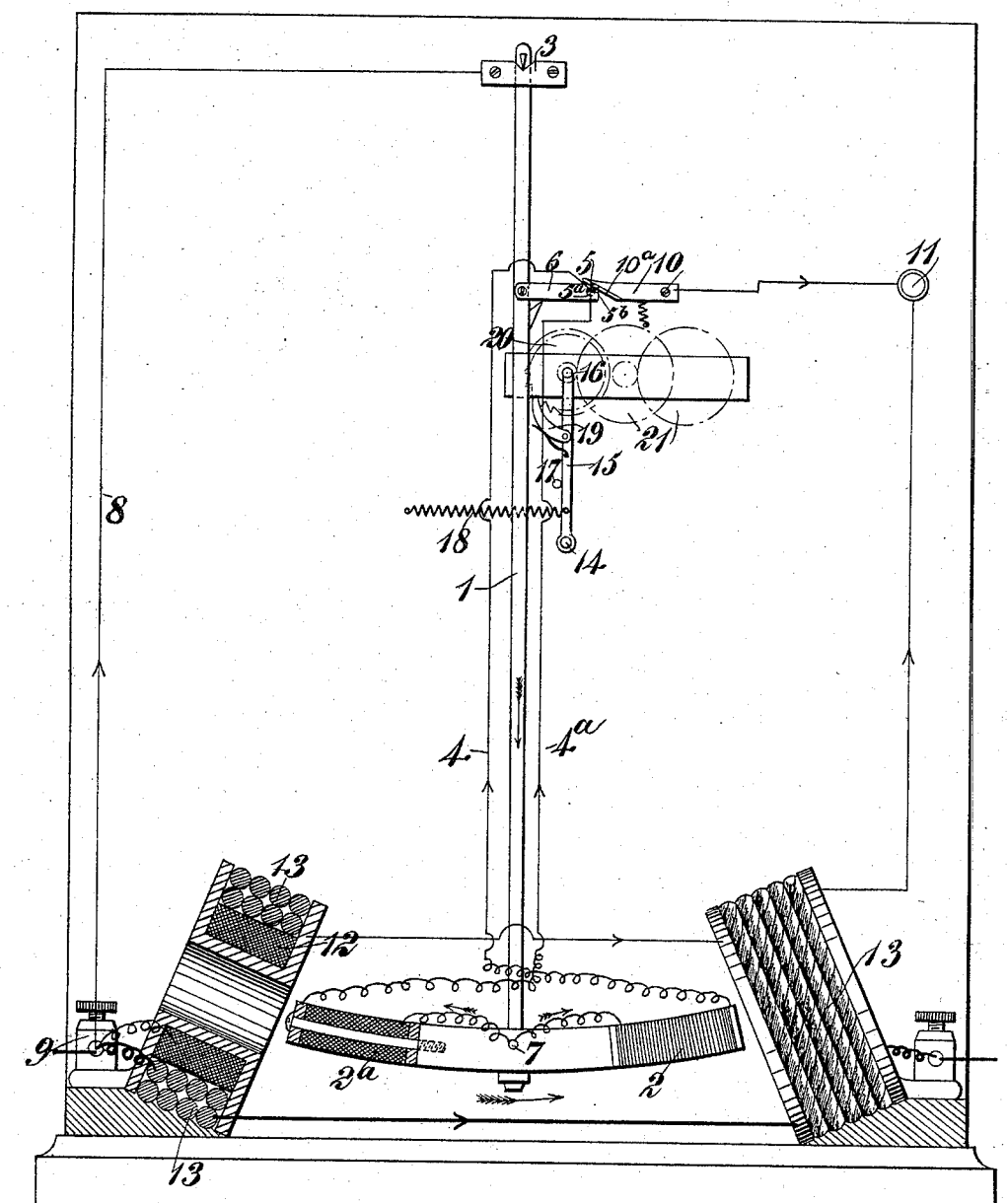
Figure 2:
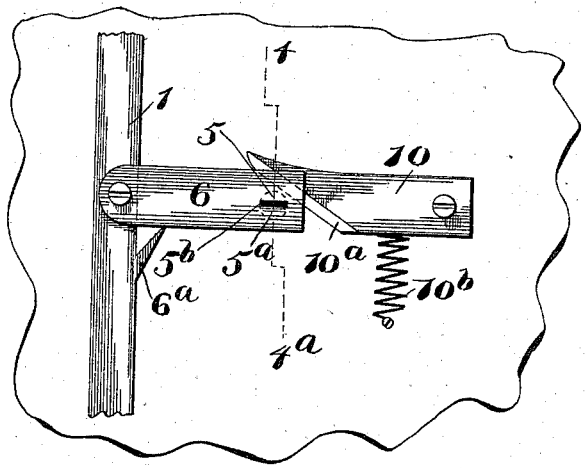
Figure 3:

In the accompanying drawings, Figure 1 illustrates diagrammatically one arrangement of electric meter constructed according to this invention. Figs. 2 and 3 are detail views.

1 is a pendulum to the lower extremity of which are fixed two fine wire coils, 2, $2^a$ the axes of which form approximately an arc of a circle struck from the axis of oscillation 3 of the pendulum. A suitable commutator or contact breaker operated by the pendulum causes a current to pass through each of these coils 2, $2^a$ alternately. For this purpose one end of the coil 2 is connected by a conductor 4 to a contact piece 5, and one end of the coil $2^a$ is connected by a conductor $4^a$ with another similar contact piece $5^a$, the two contact pieces 5, $5^a$ being insulated from each other by insulating material $5^b$ and carried by a bar 6 pivoted to the pendulum 1 as more clearly shown in Figs. 2 and 3. The other ends of the two coils are connected at 7 to the pendulum which is in metallic connection by a conductor 8 with one of the terminals 9 of the instrument.

10 is a pivoted metal bar connected to a terminal 11 that is in connection with the return conductor when the meter is in use. This bar is formed with a projecting flange $10^a$, the under surface of which on the pendulum swinging in the direction of the arrow, slides over the contact pieces 5 and places the coil 2 in a shunt circuit between the electric mains. On the pendulum swinging in the reverse direction the contact pieces $5^a$ will slide over the top of the said flange thereby breaking the circuit of the coil 2 and placing the coil $2^a$ in a shunt circuit.

$6^a$ is a stop carried by the pendulum and serving to limit the downward movement of the bar 6.

$10^b$ is a spring that serves to press the flange $10^a$ in contact with the contact pieces 5 $5^a$ alternately.

On each side of the pendulum is fixed a coil 12 so arranged that the coil 2 or $2^a$ on the corresponding side of the pendulum, can swing freely into and more than half way through it. These two coils 12 are in circuit with each other, and are, when the meter is in use, in a shunt across the electric mains between which a constant electro motive force is normally maintained. On the outside of each of these two coils 12 is wound another coil 13 consisting of a few turns of thick wire through which the current to be metered is made to pass in such a way as to increase the magnetic field caused by the shunt current flowing through the fine wire coils 12 within them.

The mechanism for imparting the increase of amplitude of the pendulum to the registering gear, consists in the example shown of a pin 14 so arranged at one side of the pendulum that when the pendulum is swinging at its normal amplitude due to a shunt current flowing through the fine wire coils 12 and alternately through the coils 2 and $2^a$, and no current to be metered is passing through the coils 13, the pendulum will come up to but will not move it. This pin is fixed to a lever 15 that is pivoted at 16. This lever is normally held against a fixed pin 17 by a spring 18 and carries a spring pawl 19 that is in gear with a ratchet wheel 20, the arrangement being such that when the pendulum swings beyond its normal amplitude, it will act against and move the said pin in one direction and move the pawl 19 over a corresponding number of teeth, and upon the pendulum swinging in the opposite direction, the lever 15 will be moved in the reverse direction by the spring 18 and will thereby cause the pawl to partly rotate the ratchet wheel. By this means the ratchet wheel will be caused to operate any suitable registering or counting mechanism 21, which will consequently register the increase of amplitude of the pendulum which will be in proportion to the current passing through the thick wire coils 13.

The meter when thus constructed will operate as follows: On a shunt current flowing through one or other of the fine wire coils 2 or $2^a$ such coil will be drawn into the magnetic field caused by the fine wire coil 12 on the same side of the pendulum thereby causing the pendulum to move to one side. The pendulum having arrived at a certain position the contact piece 5 or $5^a$ as the case may be, will move out of contact with the pivoted bar 10 and the circuit of the said shunt coil will be broken. The pendulum will then swing in the reverse direction and when it resumes its vertical position or nearly so the circuit of the other coil $2^a$ or 2 will be completed by the contact piece $5^a$ or 5 and pivoted bar and such coil will be drawn into the magnetic field caused by the fine wire coil 12 at its opposite side and thus the pendulum will continue to swing at a constant speed with a constant amplitude and up to the pin 14 of the registering gear but without moving this pin, and therefore without operating the registering mechanism; but directly the current to be metered is caused to flow through the thick wire or series coils 13 the magnetic field due to the two stationary coils 12 will be increased, whereby the amplitude of the pendulum will be increased, thereby causing the pendulum to move the pin 14 and operate the registering mechanism which will thus register the amount of current passing.

What I claim is—

1. An electric meter in which an oscillating device having a constant rate of vibration is combined with a coil so arranged in relation to said oscillating device that a current flowing through said coil will vary the amplitude of vibration of said oscillating device, and a registering device adapted to come into operation only when said amplitude of vibration is varied, and to record said variation of amplitude of vibration as set forth.

2. An electric meter comprising an oscillating device, a shunt coil carried thereby, a contact making and breaking device for controlling the circuit of said shunt coil, a body arranged in inductive relation to said shunt coil and adapted to cause movement of said coil and oscillating device, a series coil so arranged in relation to said shunt coil that a current flowing therethrough will increase the amplitude of vibration of said oscillating device and shunt coil, and a registering device operated by said oscillating device when its amplitude of vibration is increased beyond the normal substantially as herein described.

3. An electric meter comprising a pendulum, shunt coils carried thereby, a contact making and breaking device operated by said pendulum and controlling the circuit of said shunt coils, electro magnetic devices arranged at opposite sides of said pendulum and shunt coils, series coils carried by said devices and a registering device that is operated by said pendulum only when a current is flowing through said series coils, substantially as herein described.

4. An electric meter comprising a pendulum having a constant rate of vibration, a series coil adapted to increase the amplitude of vibration of said pendulum, and a registering device adapted to record the said increase of amplitude, substantially as described.

5. An electric meter comprising an oscillating device, an electro magnetic device carried thereby, a circuit making and breaking device operated by said oscillating device and controlling the circuit of said electro magnetic device, means for causing said oscillating device to oscillate at a constant rate, fixed series coils adapted when energized to increase the amplitude of vibration of said oscillating device, and registering mechanism adapted to register said increase of vibration substantially as described.

6. An electric meter comprising a pendulum, a shunt coil carried thereby, a contact maker and breaker comprising movable and fixed contacts, and electric connections as set forth, a lever arranged to be operated by said pendulum at each vibration thereof and to operate said contact maker and breaker, shunt coils fixed one at each side of said pendulum, series coils wound upon said fixed shunt coils, and a registering device operated by said pendulum substantially as herein described.

In testimony whereof I have signed my name to this specification in the presence of two subscribing witnesses.

HAYDN THIES HARRISON.

Witnesses:
F. J. BROUGHAM,
CHARLES GARWOOD,
*Both of 46 Lincoln's Inn Fields, London, W.C.*